(12) United States Patent
Wang et al.

(10) Patent No.: US 12,471,030 B2
(45) Date of Patent: Nov. 11, 2025

(54) TRANSMISSION PARAMETER MANAGEMENT METHOD AND APPARATUS, AND ELECTRONIC DEVICE

(71) Applicant: VIVO MOBILE COMMUNICATION CO., LTD., Guangdong (CN)

(72) Inventors: Huan Wang, Guangdong (CN); Jinhua Liu, Guangdong (CN); Shuyan Peng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 343 days.

(21) Appl. No.: 18/307,358

(22) Filed: Apr. 26, 2023

(65) Prior Publication Data

US 2024/0049144 A1     Feb. 8, 2024

Related U.S. Application Data

(63) Continuation of application No. PCT/CN2021/127281, filed on Oct. 29, 2021.

(30) Foreign Application Priority Data

Nov. 2, 2020  (CN) .......................... 202011206318.7

(51) Int. Cl.
*H04W 52/24* (2009.01)
*H04W 52/16* (2009.01)
*H04W 52/36* (2009.01)

(52) U.S. Cl.
CPC ........... *H04W 52/24* (2013.01); *H04W 52/16* (2013.01); *H04W 52/367* (2013.01)

(58) Field of Classification Search
CPC . H04W 84/047; H04W 88/085; H04W 88/14; H04W 24/10; H04W 48/18; H04W 52/24; H04W 52/16; H04W 52/367
See application file for complete search history.

(56) References Cited

U.S. PATENT DOCUMENTS

2019/0394084 A1   12/2019  Tsai et al.
2020/0336986 A1   10/2020  Chen et al.
(Continued)

FOREIGN PATENT DOCUMENTS

CN         109151979 A      1/2019
CN         110087296 A      8/2019
(Continued)

OTHER PUBLICATIONS

Moderator (Qualcomm Incorporated), "Summary #3 of [102-e-NR-eIAB-02]", 3GPP TSG RAN WG1 Meeting #102-e, R1-2007352, Aug. 17-28, 2020.
(Continued)

*Primary Examiner* — Dung Hong
(74) *Attorney, Agent, or Firm* — Price Heneveld LLP (57) ABSTRACT

This application discloses a transmission parameter management method and apparatus, and an electronic device. The transmission parameter management method is executed by a first integrated access backhaul IAB node and includes: obtaining assistance information related to a transmission parameter of a second IAB node and/or assistance information related to a measurement parameter; and determining a transmission parameter based on the assistance information.

20 Claims, 5 Drawing Sheets

Obtain assistance information related to a transmission parameter of a second IAB node and/or assistance information related to a measurement parameter — 101

Determine a transmission parameter based on the assistance information — 102

(56) References Cited

U.S. PATENT DOCUMENTS

| | | | |
|---|---|---|---|
| 2020/0337048 A1 | 10/2020 | Abedini et al. | |
| 2021/0120517 A1* | 4/2021 | Akkarakaran | G01S 5/02213 |
| 2021/0168728 A1 | 6/2021 | Liu et al. | |
| 2021/0258889 A1 | 8/2021 | Zhang et al. | |
| 2021/0259051 A1* | 8/2021 | Latheef | H04W 76/12 |
| 2021/0360534 A1* | 11/2021 | Wei | H04W 52/242 |
| 2021/0368424 A1 | 11/2021 | He | |
| 2022/0046638 A1* | 2/2022 | Cudak | H04B 7/15542 |
| 2022/0400427 A1* | 12/2022 | Huang | H04W 48/16 |

FOREIGN PATENT DOCUMENTS

| | | | | |
|---|---|---|---|---|
| CN | 110536395 A | | 12/2019 | |
| CN | 110809293 A | * | 2/2020 | H04W 28/16 |
| CN | 110831135 A | | 2/2020 | |
| WO | 2019194902 A2 | | 10/2019 | |
| WO | 2019240808 A1 | | 12/2019 | |
| WO | 2020091950 A1 | | 5/2020 | |
| WO | 2020093361 A1 | | 5/2020 | |
| WO | 2020164146 A1 | | 8/2020 | |
| WO | 2020186401 A1 | | 9/2020 | |
| WO | WO-2022074811 A1 | * | 4/2022 | H04W 52/38 |

OTHER PUBLICATIONS

Vivo, "Other enhancements for simultaneous operation of child and parent links", 3GPP TSG RAN WG1 #103-e, R1-2007685, Oct. 26-Nov. 13, 2020, e-Meeting.

* cited by examiner

TRANSMISSION PARAMETER MANAGEMENT METHOD AND APPARATUS, AND ELECTRONIC DEVICE

CROSS-REFERENCE TO RELATED APPLICATIONS

This application is a continuation application of International Application No. PCT/CN2021/127281 filed on Oct. 29, 2021, which claims priority to Chinese Patent Application No. 202011206318.7, filed in China on Nov. 2, 2020, which are incorporated herein by reference in their entireties.

TECHNICAL FIELD

This application relates to the field of communications technologies, and in particular, to a transmission parameter management method and apparatus, and an electronic device.

BACKGROUND

The open-loop power control mechanism is used in new radio (NR) downlink (DL) transmission. For transmission of synchronization signal block (SSB/PSS/SSS/PBCH) and/or periodic channel state information-reference signal (CSI-RS), a base station uses fixed energy per resource element (EPRE), and notifies user equipment (UE) of such EPRE in advance, so that the UE can perform signal strength measurement. For transmission of physical downlink control channel (PDCCH) in control resource set (CORESET) #0, its EPRE is controlled within a range, and the base station notifies the UE of the dynamic range in advance. For transmission of other DL channels (channel) and/or signals (signaling), the base station determines a transmit power through implementation and does not notify the UE of related information.

Open-loop and closed-loop power control is used in NR uplink (UL) transmission, and the UE determines a transmit power of UL channel through open-loop power control or closed-loop power control. In addition, the UL transmit power of the UE is also limited by a maximum transmit power value predefined by a protocol, and the UL transmit power of the UE is not allowed to exceed this value at any time.

However, power spectral density (PSD) imbalance between a DU and an MT of an IAB node is not considered in the existing power control mechanism of NR.

SUMMARY

According to a first aspect, an embodiment of this application provides a transmission parameter management method, executed by a first integrated access backhaul IAB node and including:
  obtaining assistance information related to a transmission parameter of a second IAB node and/or assistance information related to a measurement parameter; and
  determining a transmission parameter based on the assistance information.

According to a second aspect, an embodiment of this application provides a transmission parameter management apparatus, executed by a first integrated access backhaul IAB node and including:
  an obtaining module, configured to obtain assistance information related to a transmission parameter of a second IAB node and/or assistance information related to a measurement parameter; and
  a processing module, configured to determine a transmission parameter based on the assistance information.

According to a third aspect, an embodiment of this application further provides an electronic device, including a processor, a memory, and a program or instructions stored in the memory and capable of running on the processor, and when the program or the instructions are executed by the processor, the steps of the method described according to the first aspect are implemented.

According to a fourth aspect, an embodiment of this application provides a readable storage medium, where a program or instructions are stored in the readable storage medium, and when the program or the instructions are executed by a processor, the steps of the method according to the first aspect are implemented.

According to a fifth aspect, an embodiment of this application provides a chip, where the chip includes a processor and a communications interface, the communications interface is coupled to the processor, and the processor is configured to run a program or instructions to implement the method according to the first aspect.

According to a sixth aspect, an embodiment of this application provides a computer program product, where the computer program product is stored in a non-volatile storage medium, and the computer program product is executed by at least one processor to implement the method according to the first aspect.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may derive other drawings from these accompanying drawings without creative efforts.

DETAILED DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the terms used in this way is interchangeable in appropriate circumstances so that the embodiments of this application can be implemented in other orders than the order illustrated or described herein. In addition, in the specification and claims, "and/or" represents presence of at least one of connected objects, and the symbol "/" in this specification usually indicates an "or" relationship between associated objects.

Technologies described in this specification are not limited to a long term evolution (LTE) or LTE-Advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are usually used interchangeably. The CDMA system can implement radio technologies such as CDMA2000 and Universal Terrestrial Radio Access (UTRA). The UTRA includes wideband CDMA (WCDMA) and other CDMA variants. The TDMA system can implement radio technologies such as the Global System for Mobile Communications (GSM). The OFDMA system can implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. The UTRA and E-UTRA are parts of the Universal Mobile Telecommunications System (UMTS). LTE and advanced LTE, such as LTE-A, are new versions of UMTS that use E-UTRA. UTRA, E-UTRA, UMTS, LTE, LTE-A, and GSM are described in the documentation of the organization called "3rd Generation Partnership Project" (3GPP). The CDMA2000 and UMB are cited from descriptions in the documentation of the organization named "3rd Generation Partnership Project 2" (3GPP2). Techniques described in this specification may be used in the aforementioned systems and radio technologies, and can also be used in other systems and radio technologies. However, in the following descriptions, an NR system is described for an illustration purpose, and NR terms are used in most of the following descriptions, although these technologies may also be applied to other applications than an NR system application.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from that described, and steps may alternatively be added, omitted, or combined. In addition, features described with reference to some examples may be combined in other examples.

Figure 1:
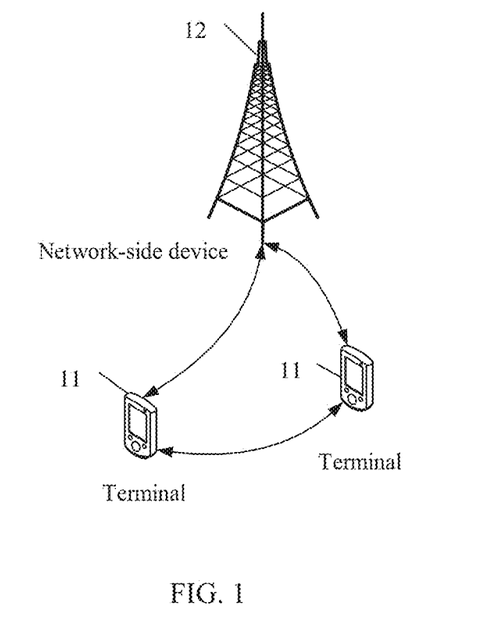
FIG. 1 is a schematic diagram of a wireless communications system.

Referring to FIG. 1, FIG. 1 is a block diagram of a wireless communications system to which the embodiments of this application are applicable. The wireless communications system includes a terminal 11 and a network-side device 12. The terminal 11 may also be referred to as a terminal device or a user terminal (User Equipment, UE). The terminal 11 may be a terminal-side device such as a mobile phone, a tablet computer (Tablet Personal Computer), a laptop computer, a personal digital assistant (PDA), a mobile Internet device (MID), a wearable device, or an in-vehicle device. It should be noted that a specific type of the terminal 11 is not limited in the embodiments of this application. The network-side device 12 may be a base station or a core network. The base station may be a 5G base station and a base station of a later version (for example, a gNB or a 5G NR NB), or a base station in another communications system (for example, an eNB, a WLAN access point, or another access point), or a location server (for example, an E-SMLC or an LMF (Location Manager Function)). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, or another appropriate term in the art. As long as a same technical effect is achieved, the base station is not limited to a specific technical term. It should be noted that in the embodiments of this application, the base station in the NR system is merely used as an example, and a specific type of the base station and a specific communications system are not limited.

Figure 2:
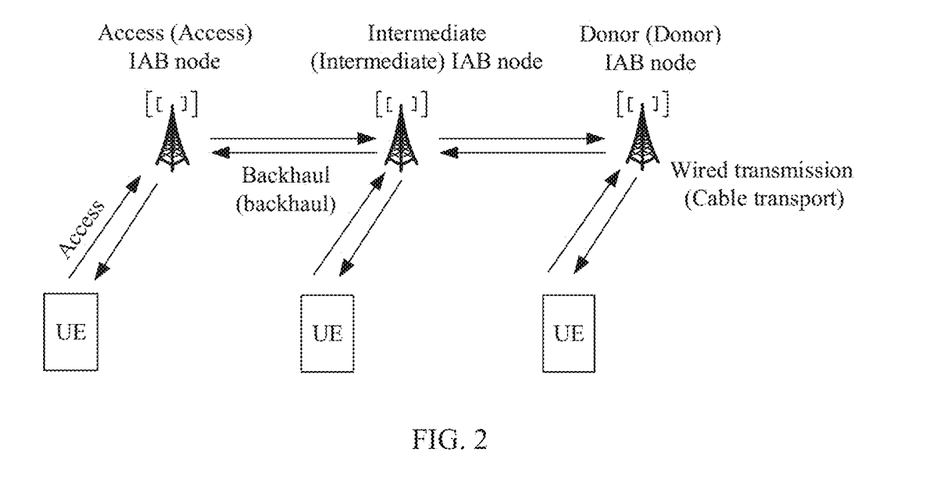
FIG. 2 is a schematic diagram of an IAB system.

FIG. 2 is a schematic diagram of an integrated access backhaul (IAB) system. An IAB node includes a distributed unit (DU) functional part and a mobile termination (MT) functional part. By using an MT, an access point (that is, IAB node) can find an upstream access point (parent IAB node) and establish a wireless link to a DU of the upstream access point. The wireless connection is referred to as a backhaul link. After an IAB node has established a complete backhaul link, the IAB node starts its DU function and the DU provides cell services, that is, the DU may provide access services for UE (UE). An integrated access backhaul loop contains a donor IAB node (or referred to as an IAB donor), and the donor IAB node is directly connected to a wired transmission network. Cable transport is wired transmission.

Figure 3:
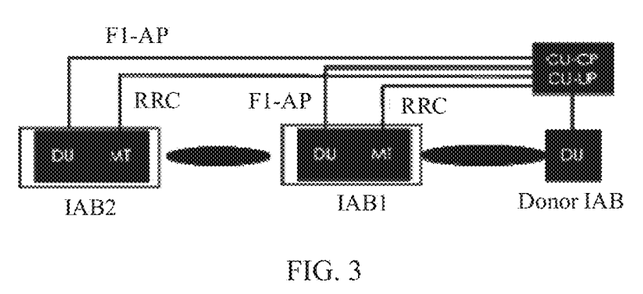
FIG. 3 is a diagram of a CU-DU structure of an IAB system.

FIG. 3 is a diagram of a CU-DU (centralized unit-distributed unit) structure of an IAB system. In an integrated access backhaul loop, DUs of all IAB nodes are connected to one centralized unit (CU) node, and the one node configures the DUs through the F1 application protocol (F1 Application Protocol or F1 control protocol). The CU configures MTs through the radio resource control (RRC) protocol. The donor IAB node has no MT functional part.

The IAB system is introduced to resolve a problem that a wired transmission network is not deployed in place for densely deployed access points. That is, when no wired transmission network is present, the access points may rely on wireless backhaul.

In order to implement resource multiplexing of frequency-division multiplexing (FDM) and/or space division multiplexing (SDM), simultaneous DU and MT transmission and reception operation modes are as follows:
(1) simultaneous DU transmit and MT transmit (DU-TX&MT-TX), which is alternatively expressed as DU being configured as downlink (DL) and MT being configured as uplink (UL), or expressed as DU for DL transmission and MT for UL transmission;
(2) simultaneous DU receive and MT receive (DU-RX&MT-RX), which is alternatively expressed as DU being configured as UL and MT being configured as DL, or expressed as DU for UL reception and MT for DL reception;

(3) DU transmit and MT receive (DU-TX&MT-RX), which is alternatively expressed as DU being configured as DL and MT being configured as DL, or expressed as DU for DL transmission and MT for DL reception; and (4) DU receive and MT transmit (DU-RX&MT-TX), which is alternatively expressed as DU being configured as UL and MT being configured as UL, or expressed as DU for UL reception and MT for UL transmission.

The open-loop power control mechanism is used in NR DL transmission. For transmission of synchronization signal block (SSB/PSS/SSS/PBCH) and/or periodic channel state information-reference signal (CSI-RS), a base station uses fixed energy per resource element (EPRE), and notifies UE of such EPRE in advance, so that the UE can perform signal strength measurement. For transmission of physical downlink control channel (PDCCH) in control resource set (CORESET) #0, its EPRE is controlled within a range, and the base station notifies the UE of the dynamic range in advance. For transmission of other DL channels (channel) and/or signals (signaling), the base station determines a transmission power through implementation and does not notify the UE of related information.

Open-loop and closed-loop power control is used in NR UL transmission, and the UE determines a transmit power of UL channel through open-loop power control or closed-loop power control. In addition, the UL transmit power of the UE is also limited by a maximum transmit power value predefined by a protocol, and the UL transmit power of the UE is not allowed to exceed this value at any time.

However, power spectral density (PSD) imbalance between a DU and an MT of an IAB node is not considered in the existing power control mechanism of NR.

Figure 4:
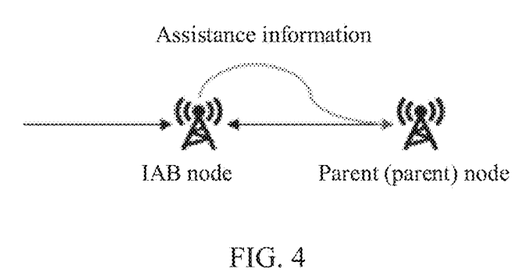
FIG. 4 to FIG. 7 are schematic diagrams of sending assistance information by an IAB node.
Figure 5:
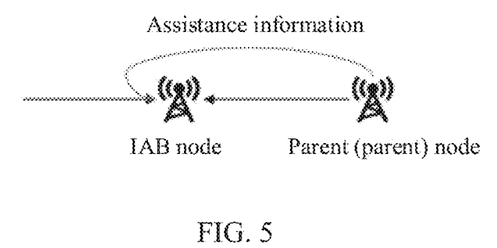
Figure 6:
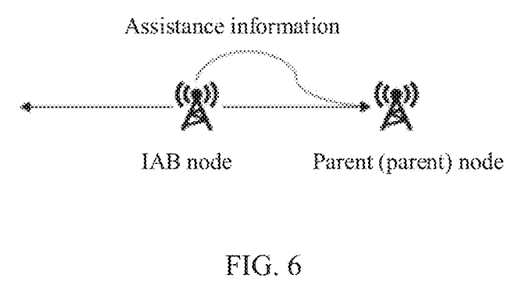
Figure 7:
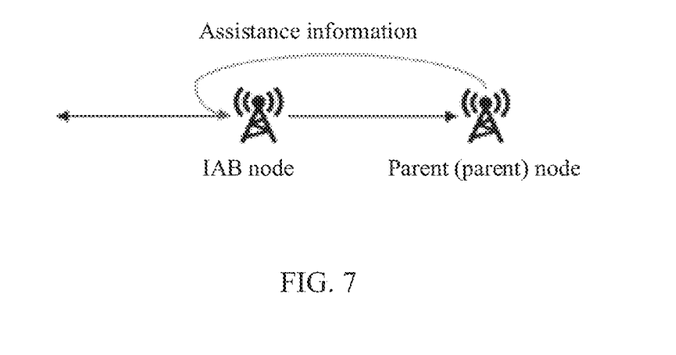

In a case of simultaneous DU receive and MT receive for the IAB, as shown in FIG. 4, an IAB node may send assistance information to a parent node to assist the parent node in downlink power control. This manner can be understood as performing close-loop (close loop) downlink power control (DL power control) by the parent node. Alternatively, as shown in FIG. 5, the parent node may send assistance information to the IAB node to assist the IAB node in uplink power control. This manner can be understood as performing open-loop (open loop) DL power control by the parent node, and the assistance information is a power control parameter. Alternatively, as shown in FIG. 6, the IAB node may send assistance information to the parent node to assist the parent node in uplink power control. Alternatively, as shown in FIG. 7, the parent node may send assistance information to the IAB node to assist the IAB node in downlink power control.

Figure 8:
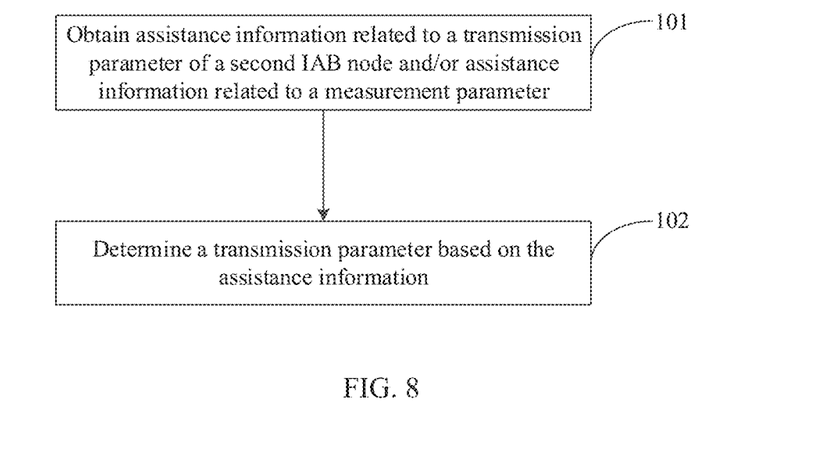
FIG. 8 is a schematic flowchart of a transmission parameter management method according to an embodiment of this application.

An embodiment of this application provides a transmission parameter management method, executed by a first IAB node. As shown in FIG. 8, the method includes the following steps.

Step 101: Obtain assistance information related to a transmission parameter of a second IAB node and/or assistance information related to a measurement parameter.

Step 102: Determine a transmission parameter based on the assistance information.

In this embodiment of this application, the first IAB node obtains the assistance information related to the transmission parameter of the second IAB node and/or the assistance information related to the measurement parameter, so that the first IAB node can determine the transmission parameter based on the assistance information, so as to resolve the problem of PSD imbalance between a DU and an MT of an IAB node.

In some embodiments, the first IAB node is an IAB node and the second IAB node is a parent IAB node, and the assistance information includes transmit power information of a distributed unit DU of the parent IAB node, where the transmit power information of the DU of the parent IAB node includes:

transmit power information of a physical downlink channel, where the physical downlink channel includes a physical downlink shared channel PDSCH and/or a physical downlink control channel PDCCH.

Figure 9:
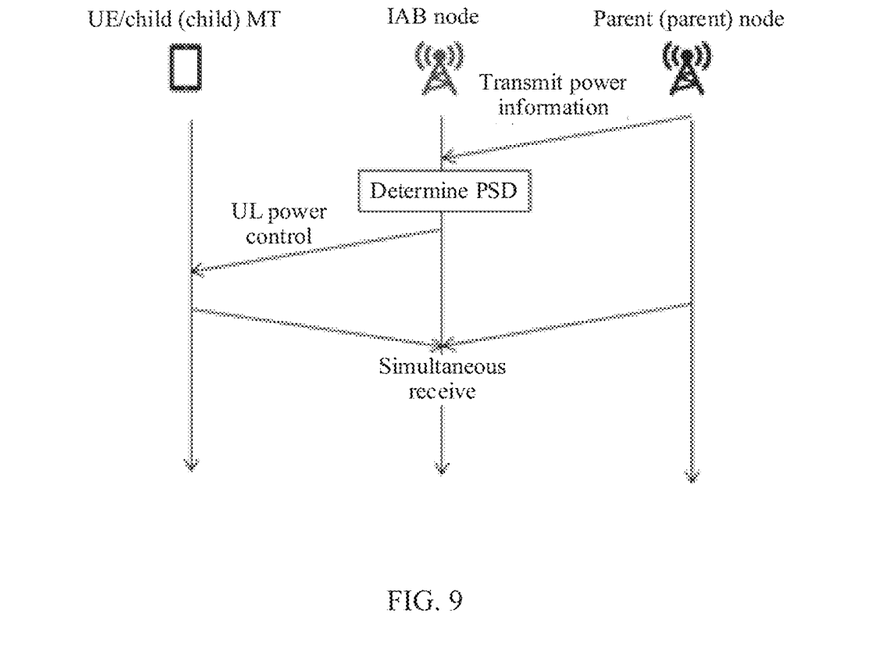
FIG. 9 is a schematic diagram of sending power information to an IAB node by a parent IAB node according to an embodiment of this application.

In this embodiment, as shown in FIG. 9, the IAB node obtains the transmit power information of the DU of the parent IAB node, and the transmit power information of the DU of the parent node includes at least energy per resource element (EPRE) information of PDSCH and/or PDCCH of the DU of the parent IAB node. The energy per resource element (EPRE) information of PDSCH and/or PDCCH may be applicable only to a moment of simultaneous DU receive and MT receive for the IAB node. After obtaining the transmit power information of the DU of the parent node, the IAB node determines a PSD of DL reception for an MT of the IAB node based on the transmit power information, so as to control power for UL scheduling of the IAB DU.

In some embodiments, the determining a transmission parameter based on the assistance information includes:

determining an uplink power control parameter of a DU of the IAB node based on the assistance information, where independent power control parameters and/or independent power control processes are used for an occasion of simultaneous DU receive and MT receive of the parent IAB node. That is, the IAB node may use independent UL power control processes and/or independent P0 values for its uplink scheduling according to different channel occasions of the parent node. For example, an SSB transmission occasion and other PDSCH transmission occasions of the parent node correspond to independent UL power control processes, where the P0 value is a power control parameter indicating initial power.

Optionally, using the existing twoPUSCH-PC-AdjustmentStates (higher-layer parameter), a CU configures that one of states of the IAB node is used for power control in a specific multiplexing scheduling mode for an MT of its child node or UE.

Optionally, in addition to the existing twoPUSCH-PC-AdjustmentStates, the CU configures one or more new PUSCH/PUCCH power control states (power control state/power adjustment state) for performing uplink power control for the MT of the child node or the UE by the IAB node in a case of both DU PUSCH/PUCCH transmit and MT PDSCH/PDCCH transmit. The method may be applied to a case of simultaneous DU PUSCH/PUCCH transmit and MT PUSCH/PUCCH transmit. In addition, a new indication field may be added to DCI to indicate whether current scheduling uses a new PUSCH power control state or one/more pieces of PUSCH power control states or one/more types of PUSCH power control states.

Optionally, when the IAB node performs uplink power adjustment/control, in addition to a power control command, the IAB node also sends an additional power adjustment parameter to adjust an uplink transmit power of the MT of the child node or the UE, and the additional power adjustment parameter is valid only for a currently scheduled PUSCH or one power control state.

The foregoing symbol "/" stands for "and/or".

In some embodiments, the transmit power information of the physical downlink channel of the DU of the parent IAB node includes:
energy per resource element EPRE information of the physical downlink channel.

In some embodiments, the EPRE information includes at least one of the following: a fixed value of EPRE and a variation range of EPRE.

In some embodiments, the variation range of EPRE includes at least one of the following:
a maximum and/or minimum value of the EPRE of the physical downlink channel;
a difference between the maximum and minimum values of the EPRE of the physical downlink channel;
an offset range of the EPRE of the physical downlink channel relative to EPRE for synchronization signal block SSB transmission of the parent IAB node, where, for example, an offset range of PDCCH EPRE in control resource set (CORESET)#0 relative to that of an SSB is extended to other PDCCHs and/or PDSCHs;
an offset range of the EPRE of the physical downlink channel relative to EPRE for primary synchronization signal PSS transmission of the parent IAB node;
an offset range of the EPRE of the physical downlink channel relative to EPRE for secondary synchronization signal SSS transmission of the parent IAB node;
an offset range of the EPRE of the physical downlink channel relative to EPRE for physical broadcast channel PBCH transmission of the parent IAB node; and
an offset range of the EPRE of the physical downlink channel relative to EPRE for channel state information reference signal CSI-RS transmission of the parent IAB node, where, for example,
an offset range of PDCCH EPRE in CORESET #0 relative to CSI-RS EPRE is extended to other PDCCHs/PDSCHs; and the CSI-RS may represent only a periodic CSI-RS.

In some embodiments, the fixed value of EPRE includes at least one of the following:
an offset value of the EPRE of the physical downlink channel relative to EPRE for SSB transmission of the parent IAB node;
an offset value of the EPRE of the physical downlink channel relative to EPRE for PSS transmission of the parent IAB node;
an offset value of the EPRE of the physical downlink channel relative to EPRE for SSS transmission of the parent IAB node;
an offset value of the EPRE of the physical downlink channel relative to EPRE for PBCH transmission of the parent IAB node; and
an offset value of the EPRE of the physical downlink channel relative to EPRE for CSI-RS transmission of the parent IAB node, where the CSI-RS may represent only a periodic CSI-RS.

In some embodiments, the transmit power information of the physical downlink channel is determined based on at least one of the following characteristics of the physical downlink channel:
a beam direction for transmission of the physical downlink channel, for example, a CSI reference signal resource indicator (CRI) and a transmission configuration indicator (TCI);
a type of information carried by the physical downlink channel, for example, downlink control information (DCI) format, ultra-reliable low-latency communication (URLLC) transmission, and enhanced mobile broadband (eMBB) transmission;
a scheduling mode for transmission of the physical downlink channel, for example, configured grant and dynamic grant; and
a time-frequency resource for transmission of the physical downlink channel, for example, a search space or CORESET in which channel transmission is performed.

In some embodiments, the first IAB node is a parent IAB node, and the second IAB node is an IAB node. At a moment of simultaneous DU transmit and MT transmit for the IAB node, adjustment of a transmit power of the MT is limited by an EPRE of the DU, and the parent node needs to know the transmit power and/or EPRE limit of the IAB MT, so that the parent node may perform uplink scheduling for the IAB MT. The parent node may obtain transmit power information of the MT of the IAB node. After obtaining the transmit power information of the MT of the IAB node, the parent node assists, based on the transmit power information, its DU in implementing mechanisms such as UL scheduling/power control. For example, a scheduling bandwidth is determined based on a maximum transmit power limit and the EPRE limit for the IAB MT.

The assistance information includes transmit power information of the IAB node, where the transmit power information of the IAB node includes at least one of the following:
energy per resource element EPRE information of a sounding reference signal SRS; and
EPRE information of a physical channel, where the physical channel includes at least one of a physical uplink shared channel PUSCH, a physical uplink control channel PUCCH, and a physical random access channel PRACH.

In some embodiments, the EPRE information includes at least one of the following: a fixed value of EPRE and a variation range of EPRE.

In some embodiments, considering that the EPRE of the MT is at the same level as EPRE of the DU, the EPRE information is replaced by at least one of the following:
EPRE for SSB transmission of a DU of the IAB node;
EPRE for PSS transmission of the DU of the IAB node;
EPRE for SSS transmission of the DU of the IAB node;
EPRE for PBCH transmission of the DU of the IAB node;
EPRE for CSI-RS transmission of the DU of the IAB node, where the CSI-RS may represent only a periodic CSI-RS;
EPRE for PDCCH transmission of the DU of the IAB node; and
EPRE for PDSCH transmission of the DU of the IAB node.

In some embodiments, the EPRE information is EPRE for uplink transmission corresponding to a specific occasion, for example, a time of sending SSB and/or CSI-RS by the IAB DU and/or a moment for simultaneous IAB DU transmit and MT transmit. The CSI-RS may represent only a periodic CSI-RS.

In some embodiments, the obtaining assistance information related to a transmission parameter of a second IAB node includes any one of the following:
obtaining assistance information that is related to the transmission parameter of the second IAB node and predefined by a protocol, which, for example, is notified to the DU by using F1-C signaling, or is notified to the MT by using radio resource control (RRC) signaling;

obtaining assistance information that is related to the transmission parameter of the second IAB node and notified by a centralized unit; and receiving the assistance information sent by the second IAB node, where transmission of the assistance information may alternatively be triggered by the first IAB node, for example, the first IAB node sends a request, and the second IAB node sends the assistance information to the first IAB node or the CU after receiving the request.

In some embodiments, the first IAB node is an IAB node and the second IAB node is a parent IAB node, and the IAB MT is limited by EPRE at the moment of simultaneous IAB DU transmit and MT transmit. An UL power control determining method of the MT needs to be modified. The assistance information includes a transmission bandwidth of the mobile termination MT of the IAB node, and the determining a transmission parameter based on the assistance information includes:

determining a transmit power of the MT based on transmit power information of the IAB node and the transmission bandwidth of the MT.

In this embodiment, the MT of the IAB node determines the transmit power of the MT based on the transmit power information, and the transmit power information of the MT of the IAB node includes at least one of the following: EPRE information of SRS for the MT of the IAB node, EPRE information of PUCCH for the MT of the IAB node, EPRE information of PUSCH for the MT of the IAB node, and EPRE information of PRACH for the MT of the IAB node.

In some embodiments, the determining a transmit power of the MT includes at least one of the following:

determining that the transmit power of the MT is EPRE1*scheduled BW, where EPRE1 is a value of EPRE for MT transmit, and scheduled BW is the transmission bandwidth of the MT;

determining that the transmit power of the MT is not less than EPREmin*scheduled BW, where EPREmin is a minimum value of EPRE for MT transmit; and determining that the transmit power of the MT is not greater than EPREmax*scheduled BW, where EPREmax is a maximum value of EPRE for MT transmit.

In some embodiments, the method further includes: obtaining transmit power information of the first IAB node itself, where the transmit power information of the first IAB node includes:

transmit power information of a downlink physical signal/channel of a DU of the first IAB node.

In some embodiments, the obtaining transmit power information of the first IAB node itself includes at least one of the following:

obtaining transmit power information of a moment of simultaneous DU transmit and MT transmit for a same type of downlink physical channel;

obtaining transmit power information of a moment of simultaneous DU transmit and MT transmit for a same type of downlink physical signal;

obtaining transmit power information of a moment of non-simultaneous DU transmit and MT transmit for a same type of downlink physical channel; and obtaining transmit power information of a moment of non-simultaneous DU transmit and MT transmit for a same type of downlink physical signal.

Transmission of some signals or channels of the IAB DU needs to meet preset transmit power requirements. For example, for transmission of SSB and/or periodic CSI-RS, the EPRE is a fixed value that is configured, or the like. Due to simultaneous DU transmit and MT transmit, transmission of the DU may not meet existing preset conditions. In this regard, the following measure can be used: The IAB node obtains an EPRE value for DL transmission, where at a moment of simultaneous/non-simultaneous IAB DU transmit and MT transmit, the IAB DU has different EPRE values for transmission of SSB, CSI-RS, or other DL channels.

In some embodiments, the method further includes:

during signal measurement on the downlink physical signal, performing an align operation on a quality measurement value measured at a moment of simultaneous DU transmit and MT transmit for the first IAB node and a quality measurement value measured at a moment of non-simultaneous DU transmit and MT transmit. For example, during calculation of layer 3 (L3) quality measurement values, a difference of EPRE needs to be compensated for layer 1 (L1) quality measurement values measured at a moment of simultaneous transmit. The quality measurement value includes a reference signal received power (RSRP) value and/or a received signal strength indicator (RSSI) value.

In some embodiments, the downlink physical signal or channel includes at least one of the following:

SSB, PSS, SSS, PBCH, and CSI-RS, where the CSI-RS may represent only a periodic CSI-RS.

In addition, in order to avoid impact on legacy UEs, the foregoing rules are applicable only to transmission of IAB-specific SSB and/or CSI-RS.

In some embodiments, the first IAB node is a parent IAB node and the second IAB node is an IAB node, and the assistance information includes information about a transmit beam of the parent IAB node measured by the IAB node, where the method further includes:

performing beam selection based on the assistance information.

In some embodiments, the plurality of beams include at least one of the following:

at least part of beams whose quality measurement value is greater than or equal to a preset threshold; and at least part of beams whose quality measurement value is less than or equal to a preset threshold.

In this embodiment, the plurality of beams reported by the IAB node include beams with poor channel quality. In this way, the parent node can flexibly use these beams with poor channel quality for transmission to the IAB node, so as to implement PSD balance for the IAB node.

In a specific example, during beam reporting, all or N beams with RSRP and/or RSSI measurement values being greater than a preset threshold are reported to the parent node, where N is a positive integer; and/or, during beam reporting, beams with smaller RSRP and/or RSSI measurement values are all reported to the parent node.

In some embodiments, the first IAB node is a parent IAB node and the second IAB node is an IAB node, and the assistance information further includes a beam used for transmission by a DU of the IAB node at a preset moment, where the method further includes at least one of the following:

determining, based on the assistance information, a transmission parameter used for transmission to an MT of the IAB node, where the transmission parameter includes at least one of a beam parameter, a power parameter, and a coding and modulation scheme (MCS) parameter; and determining, based on the assistance information, whether to transmit data to the MT of the IAB node at the preset moment.

In this embodiment, the IAB node reports, to the parent node, a beam that is used by the DU of the IAB node for UL and/or DL transmission at a specific moment. In this way, the parent node can determine, based on the beam used by the IAB DU, an interference of DU UL and/or DL transmission on MT reception, so as to determine a transmission parameter such as beam, MCS, and power to be used during transmission to the IAB MT, or determine whether data can be transmitted to the IAB MT at this moment.

In order to assist the parent node in determining, the IAB node may also report an interference status of a DU-MT beam pair. In some embodiments, the assistance information further includes the interference status of the DU-MT beam pair. The interference status of the DU-MT beam pair may include: interference of DU to MT or interference of MT to DU during transmission using a DU-MT beam pair. The interference status can also directly reflect whether the IAB node can use the DU-MT beam pair for simultaneous transmission. For example, the interference status is represented in binary, '0' means the DU-MT beam pair being allowed for simultaneous transmission, and '1' means the DU-MT beam pair not being allowed for simultaneous transmission; or vice versa.

It should be noted that the transmission parameter management method provided in this embodiment of this application is executed by a transmission parameter management apparatus or a control module for executing the transmission parameter management method in the transmission parameter management apparatus. In the embodiments of this application, the transmission parameter management method provided by the embodiments of this application is described by using an example in which the transmission parameter management method is executed by the transmission parameter management apparatus.

Figure 10:
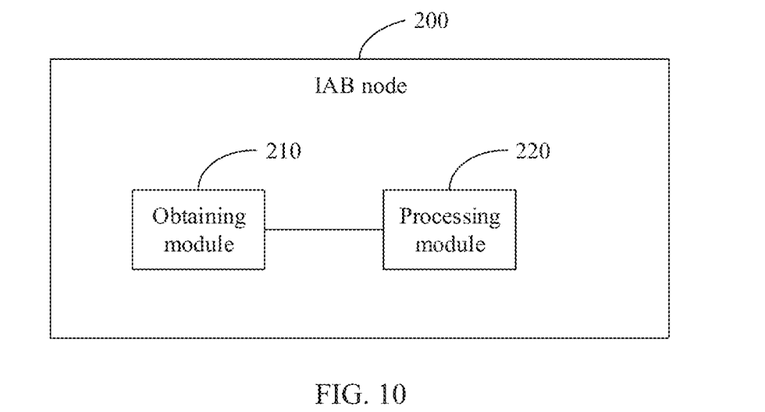
FIG. 10 is a schematic structural diagram of a transmission parameter management apparatus according to an embodiment of this application.

An embodiment of this application provides a transmission parameter management apparatus applied to an IAB node 200. As shown in FIG. 10, the apparatus includes:
- an obtaining module 210, configured to obtain assistance information related to a transmission parameter of a second IAB node and/or assistance information related to a measurement parameter; and
- a processing module 220, configured to determine a transmission parameter based on the assistance information.

In this embodiment of this application, the first IAB node obtains the assistance information related to the transmission parameter of the second IAB node and/or the assistance information related to the measurement parameter, so that the first IAB node can determine the transmission parameter based on the assistance information, so as to resolve the problem of PSD imbalance between a DU and an MT of an IAB node.

In some embodiments, the first IAB node is an IAB node and the second IAB node is a parent IAB node, and the assistance information includes transmit power information of a distributed unit DU of the parent IAB node, where the transmit power information of the DU of the parent IAB node includes:
- transmit power information of a physical downlink channel, where the physical downlink channel includes a physical downlink shared channel PDSCH and/or a physical downlink control channel PDCCH.

In some embodiments, the processing module is specifically configured to determine an uplink power control parameter of a DU of the IAB node based on the assistance information, where independent power control parameters and/or independent power control processes are used for an occasion of simultaneous DU receive and MT receive of the parent IAB node.

Optionally, using the existing twoPUSCH-PC-AdjustmentStates (higher-layer parameter), a CU configures that one of states of the IAB node is used for power control for an MT of its child node or UE in a specific multiplexing scheduling mode.

Optionally, in addition to the existing twoPUSCH-PC-AdjustmentStates, the CU configures one or more new PUSCH/PUCCH power control states (power control state/power adjustment state) for performing uplink power control for the MT of the child node or the UE by the IAB node in a case of both DU PUSCH/PUCCH transmit and MT PDSCH/PDCCH transmit. The method may be applied to a case of simultaneous DU PUSCH/PUCCH transmit and MT PUSCH/PUCCH transmit. In addition, a new indication field may be added to DCI to indicate whether current scheduling uses a new PUSCH power control state or one/more pieces of PUSCH power control states or one/more types of PUSCH power control states.

Optionally, when the IAB node performs uplink power adjustment/control, in addition to a power control command, the IAB node also sends an additional power adjustment parameter to adjust an uplink transmit power of the MT of the child node or the UE, and the additional power adjustment parameter is valid only for a currently scheduled PUSCH or one power control state.

The foregoing symbol "/" stands for "and/or".

In some embodiments, the transmit power information of the physical downlink channel of the DU of the parent IAB node includes:
- energy per resource element EPRE information of the physical downlink channel.

In some embodiments, the EPRE information includes at least one of the following: a fixed value of EPRE and a variation range of EPRE.

In some embodiments, the variation range of EPRE includes at least one of the following:
- a maximum and/or minimum value of the EPRE of the physical downlink channel;
- a difference between the maximum and minimum values of the EPRE of the physical downlink channel;
- an offset range of the EPRE of the physical downlink channel relative to EPRE for synchronization signal block SSB transmission of the parent IAB node;
- an offset range of the EPRE of the physical downlink channel relative to EPRE for primary synchronization signal PSS transmission of the parent IAB node;
- an offset range of the EPRE of the physical downlink channel relative to EPRE for secondary synchronization signal SSS transmission of the parent IAB node;
- an offset range of the EPRE of the physical downlink channel relative to EPRE for physical broadcast channel PBCH transmission of the parent IAB node; and
- an offset range of the EPRE of the physical downlink channel relative to EPRE for channel state information reference signal CSI-RS transmission of the parent IAB node, where the CSI-RS may represent only a periodic CSI-RS.

In some embodiments, the fixed value of EPRE includes at least one of the following:
- an offset value of the EPRE of the physical downlink channel relative to EPRE for SSB transmission of the parent IAB node;

an offset value of the EPRE of the physical downlink channel relative to EPRE for PSS transmission of the parent IAB node;

an offset value of the EPRE of the physical downlink channel relative to EPRE for SSS transmission of the parent IAB node;

an offset value of the EPRE of the physical downlink channel relative to EPRE for PBCH transmission of the parent IAB node; and an offset value of the EPRE of the physical downlink channel relative to EPRE for CSI-RS transmission of the parent IAB node, where the CSI-RS may represent only a periodic CSI-RS.

In some embodiments, the transmit power information of the physical downlink channel is determined based on at least one of the following characteristics of the physical downlink channel:

a beam direction for transmission of the physical downlink channel;

a type of information carried by the physical downlink channel;

a scheduling mode for transmission of the physical downlink channel; and a time-frequency resource for transmission of the physical downlink channel.

In some embodiments, the first IAB node is a parent IAB node and the second IAB node is an IAB node, and the assistance information includes transmit power information of the IAB node, where the transmit power information of the IAB node includes at least one of the following:

energy per resource element EPRE information of a sounding reference signal SRS; and EPRE information of a physical channel, where the physical channel includes at least one of a physical uplink shared channel PUSCH, a physical uplink control channel PUCCH, and a physical random access channel PRACH.

In some embodiments, the EPRE information includes at least one of the following: a fixed value of EPRE and a variation range of EPRE.

In some embodiments, considering that the EPRE of the MT is at the same level as EPRE of the DU, the EPRE information is replaced by at least one of the following:

EPRE for SSB transmission of a DU of the IAB node;
EPRE for PSS transmission of the DU of the IAB node;
EPRE for SSS transmission of the DU of the IAB node;
EPRE for PBCH transmission of the DU of the IAB node;
EPRE for CSI-RS transmission of the DU of the IAB node, where the CSI-RS may represent only a periodic CSI-RS;
EPRE for PDCCH transmission of the DU of the IAB node; and
EPRE for PDSCH transmission of the DU of the IAB node.

In some embodiments, the EPRE information is EPRE for uplink transmission corresponding to a specific occasion.

In some embodiments, the obtaining module is specifically configured to perform any one of the following:

obtaining assistance information that is related to the transmission parameter of the second IAB node and predefined by a protocol, which, for example, is notified to the DU by using F1-C signaling, or is notified to the MT by using radio resource control (RRC) signaling.

obtaining assistance information that is related to the transmission parameter of the second IAB node and notified by a centralized unit; and receiving the assistance information sent by the second IAB node, where transmission of the assistance information may alternatively be triggered by the first IAB node, for example, the first IAB node sends a request, and the second IAB node sends the assistance information to the first IAB node or the CU after receiving the request.

In some embodiment, the first IAB node is an IAB node and the second IAB node is a parent IAB node, and the assistance information includes a transmission bandwidth of a mobile termination MT of the IAB node, where the processing module is specifically configured to: determine a transmit power of the MT based on transmit power information of the IAB node and the transmission bandwidth of the MT.

In some embodiments, the processing module is specifically configured to perform at least one of the following:

determining that the transmit power of the MT is EPRE1*scheduled BW, where EPRE1 is a value of EPRE for MT transmit, and scheduled BW is the transmission bandwidth of the MT;

determining that the transmit power of the MT is not less than EPREmin*scheduled BW, where EPREmin is a minimum value of EPRE for MT transmit; and determining that the transmit power of the MT is not greater than EPREmax*scheduled BW, where EPREmax is a maximum value of EPRE for MT transmit.

In some embodiments, the obtaining module is further configured to obtain transmit power information of the first IAB node itself, where the transmit power information of the first IAB node includes:

transmit power information of a downlink physical signal and/or channel of a DU of the first IAB node.

In some embodiments, the obtaining module is specifically configured to perform at least one of the following:

obtaining transmit power information of a moment of simultaneous DU transmit and MT transmit for a same type of downlink physical channel;

obtaining transmit power information of a moment of simultaneous DU transmit and MT transmit for a same type of downlink physical signal;

obtaining transmit power information of a moment of non-simultaneous DU transmit and MT transmit for a same type of downlink physical channel; and obtaining transmit power information of a moment of non-simultaneous DU transmit and MT transmit for a same type of downlink physical signal.

In some embodiments, the processing module is further configured to: during signal measurement on the downlink physical signal, perform an align operation on a quality measurement value measured at a moment of simultaneous DU transmit and MT transmit for the first IAB node and a quality measurement value measured at a moment of non-simultaneous DU transmit and MT transmit.

In some embodiments, the downlink physical signal or channel includes at least one of the following:

SSB, PSS, SSS, PBCH, and CSI-RS, where the CSI-RS may represent only a periodic CSI-RS.

In some embodiments, the first IAB node is a parent IAB node and the second IAB node is an IAB node, and the assistance information includes information about a transmit beam of the parent IAB node measured by the IAB node, where the processing module is further configured to perform beam selection based on the assistance information.

In some embodiments, the plurality of beams include at least one of the following:

at least part of beams whose quality measurement value is greater than or equal to a preset threshold; and at least part of beams whose quality measurement value is less than or equal to a preset threshold.

In some embodiments, the first IAB node is a parent IAB node and the second IAB node is an IAB node, and the assistance information further includes a beam used for transmission by a DU of the IAB node at a preset moment, where the processing module is further configured to perform beam selection based on the assistance information:

determining, based on the assistance information, a transmission parameter used for transmission to an MT of the IAB node, where the transmission parameter includes at least one of a beam parameter, a power parameter, and a coding and modulation scheme parameter; and determining, based on the assistance information, whether to transmit data to the MT of the IAB node at the preset moment.

In order to assist the parent node in determining, the IAB node may also report an interference status of a DU-MT beam pair. In some embodiments, the assistance information further includes the interference status of the DU-MT beam pair. The interference status of the DU-MT beam pair may include: interference of DU to MT or interference of MT to DU during transmission using a DU-MT beam pair. The interference status can also directly reflect whether the IAB node can use the DU-MT beam pair for simultaneous transmission. For example, the interference status is represented in binary, '0' means the DU-MT beam pair being allowed for simultaneous transmission, and '1' means the DU-MT beam pair not being allowed for simultaneous transmission; or vice versa.

The transmission parameter management apparatus in this embodiment of this application may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a network-attached storage (NAS), a personal computer (PC), a television (TV), a teller machine, a self-service machine, or the like. This is not specifically limited in the embodiments of this application.

The transmission parameter management apparatus in this embodiment of this application may be an apparatus with an operating system. The operating system may be an Android operating system, an iOS operating system, or other possible operating systems, and is not specifically limited in the embodiments of this application.

Optionally, an embodiment of this application further provides an electronic device, including a processor, a memory, and a program or instructions stored in the memory and capable of running on the processor. When the program or the instructions are executed by the processor, the processes of the foregoing embodiment of the transmission parameter management method are implemented, with the same technical effects achieved. To avoid repetition, details are not described herein again.

It should be noted that the electronic device in this embodiment of this application includes the aforementioned mobile electronic device and non-mobile electronic device.

Figure 11:
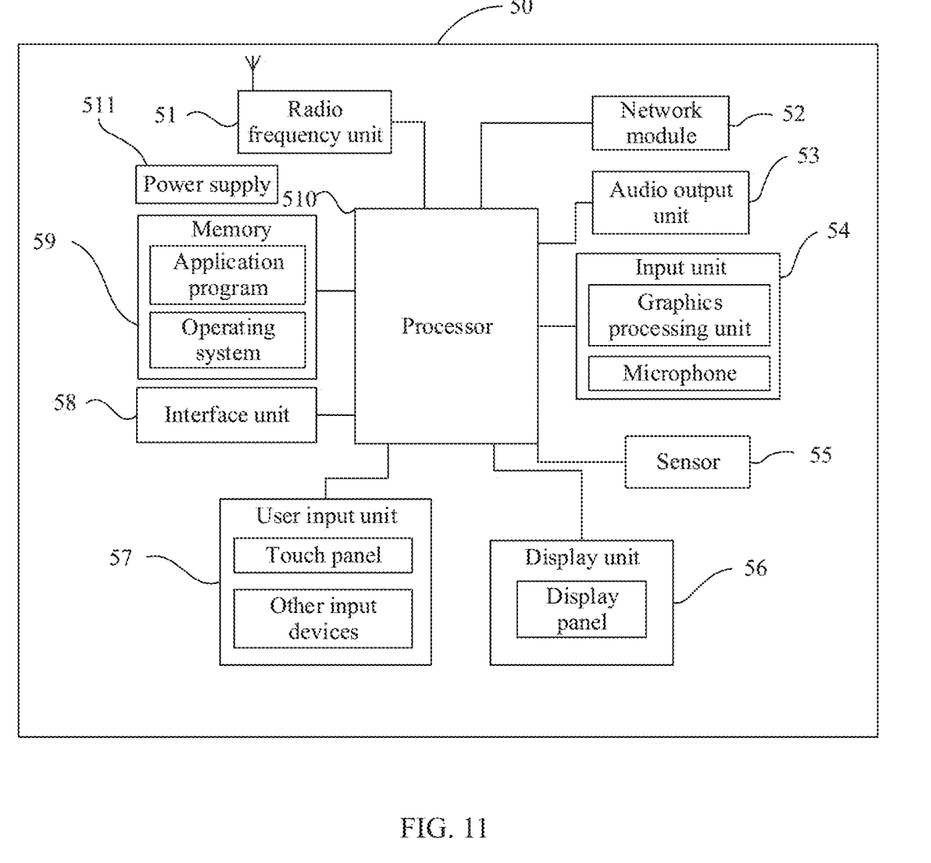
FIG. 11 is a schematic compositional diagram of a terminal according to an embodiment of this application.

The electronic device in this embodiment may be a terminal. FIG. 11 is a schematic structural diagram of hardware of a terminal according to the embodiments of this application. The terminal 50 includes but is not limited to components such as a radio frequency unit 51, a network module 52, an audio output unit 53, an input unit 54, a sensor 55, a display unit 56, a user input unit 57, an interface unit 58, a memory 59, a processor 510, and a power supply 511. A person skilled in the art may understand that the structure of the terminal shown in FIG. 11 does not constitute any limitation on the terminal device. The terminal may include more or fewer components than shown in the figure, or a combination of some components, or the components disposed differently. In this embodiment of this application, the terminal includes, but is not limited to, a mobile phone, a tablet computer, a laptop computer, a personal digital assistant, an in-vehicle terminal, a wearable device, a pedometer, and the like.

It should be understood that in this embodiment of this application, the radio frequency unit 51 may be configured to receive and send information, or to receive and send a signal in a call process, and specially, after receiving downlink data from a base station, send the downlink data to the processor 510 for processing; and also send uplink data to the base station. Generally, the radio frequency unit 51 includes but is not limited to an antenna, at least one amplifier, a transceiver, a coupler, a low noise amplifier, a duplexer, and the like. In addition, the radio frequency unit 51 may also communicate with a network and other devices via a wireless communications system.

The memory 59 may be configured to store software programs and various data. The memory 59 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 59 may include a high-speed random access memory, and may further include a non-volatile memory such as a disk storage device, a flash memory device, or another volatile solid-state storage device.

The processor 510 is a control center of the terminal, uses various interfaces and lines to connect parts of the entire terminal, and executes various functions and processing data of the terminal by running or executing software programs and/or modules stored in the memory 59 and invoking data stored in the memory 59, so as to perform overall monitoring on the terminal. The processor 510 may include one or at least two processing units. Preferably, the processor 510 may integrate an application processor and a modem processor. The application processor mainly processes the operating system, a user interface, an application program, and the like. The modem processor mainly processes wireless communication. It can be understood that the modem processor may alternatively be not integrated in the processor 510.

The terminal 50 may further include the power supply 511 (such as a battery) supplying power to each component. Preferably, the power supply 511 may be logically connected to the processor 510 by using a power management system, so that functions such as charge and discharge management and power consumption management are implemented by using the power management system.

In addition, the terminal 50 includes some functional modules that are not illustrated. Details are not described herein.

The processor 510 is configured to obtain assistance information related to a transmission parameter of a second IAB node and/or assistance information related to a measurement parameter; and determine a transmission parameter based on the assistance information.

In some embodiments, the first IAB node is an IAB node and the second IAB node is a parent IAB node, and the assistance information includes transmit power information of a distributed unit DU of the parent IAB node, where the transmit power information of the DU of the parent IAB node includes:
  transmit power information of a physical downlink channel, where the physical downlink channel includes a physical downlink shared channel PDSCH and/or a physical downlink control channel PDCCH.

In some embodiments, The processor 510 is specifically configured to determine an uplink power control parameter of a DU of the IAB node based on the assistance information, where independent power control parameters and/or independent power control processes are used for an occasion of simultaneous DU receive and MT receive of the parent IAB node.

Optionally, using the existing twoPUSCH-PC-AdjustmentStates (higher-layer parameter), a CU configures that one of states of the IAB node is used for power control for an MT of its child node or UE in a specific multiplexing scheduling mode.

Optionally, in addition to the existing twoPUSCH-PC-AdjustmentState, the CU configures one or more new PUSCH/PUCCH power control states (power control state/power adjustment state) for uplink power control for the MT of the child node or the UE by the IAB node during simultaneous transmission of DU PUSCH/PUCCH and MT PDSCH/PDCCH. The method may be applied to a case of simultaneous transmission of DU PUSCH/PUCCH and MT PUSCH/PUCCH. In addition, a new indication field may be introduced into DCI to indicate whether current scheduling uses a new PUSCH power control state, or one/more pieces of PUSCH power control states, or one/more types of PUSCH power control states.

Optionally, when the IAB node performs uplink power adjustment/control, in addition to a power control command, the IAB node also sends an additional power adjustment parameter to adjust an uplink transmit power of the MT of the child node or the UE, and the additional power adjustment parameter is valid only for a currently scheduled PUSCH or for one power control state.

The foregoing symbol "/" stands for "and/or".

In some embodiments, the transmit power information of the physical downlink channel of the DU of the parent IAB node includes:
  energy per resource element EPRE information of the physical downlink channel.

In some embodiments, the EPRE information includes at least one of the following: a fixed value of EPRE and a variation range of EPRE.

In some embodiments, the variation range of EPRE includes at least one of the following:
  a maximum and/or minimum value of the EPRE of the physical downlink channel;
  a difference between the maximum and minimum values of the EPRE of the physical downlink channel;
  an offset range of the EPRE of the physical downlink channel relative to EPRE for synchronization signal block SSB transmission of the parent IAB node;
  an offset range of the EPRE of the physical downlink channel relative to EPRE for primary synchronization signal PSS transmission of the parent IAB node;
  an offset range of the EPRE of the physical downlink channel relative to EPRE for secondary synchronization signal SSS transmission of the parent IAB node;
  an offset range of the EPRE of the physical downlink channel relative to EPRE for physical broadcast channel PBCH transmission of the parent IAB node; and
  an offset range of the EPRE of the physical downlink channel relative to EPRE for channel state information reference signal CSI-RS transmission of the parent IAB node, where the CSI-RS may represent only a periodic CSI-RS.

In some embodiments, the fixed value of EPRE includes at least one of the following:
  an offset value of the EPRE of the physical downlink channel relative to EPRE for SSB transmission of the parent IAB node;
  an offset value of the EPRE of the physical downlink channel relative to EPRE for PSS transmission of the parent IAB node;
  an offset value of the EPRE of the physical downlink channel relative to EPRE for SSS transmission of the parent IAB node;
  an offset value of the EPRE of the physical downlink channel relative to EPRE for PBCH transmission of the parent IAB node; and
  an offset value of the EPRE of the physical downlink channel relative to EPRE for CSI-RS transmission of the parent IAB node, where the CSI-RS may represent only a periodic CSI-RS.

In some embodiments, the transmit power information of the physical downlink channel is determined based on at least one of the following characteristics of the physical downlink channel:
  a beam direction for transmission of the physical downlink channel;
  a type of information carried by the physical downlink channel;
  a scheduling mode for transmission of the physical downlink channel; and
  a time-frequency resource for transmission of the physical downlink channel.

In some embodiments, the first IAB node is a parent IAB node and the second IAB node is an IAB node, and the assistance information includes transmit power information of the IAB node, where the transmit power information of the IAB node includes at least one of the following:
  energy per resource element EPRE information of a sounding reference signal SRS; and
  EPRE information of a physical channel, where the physical channel includes at least one of a physical uplink shared channel PUSCH, a physical uplink control channel PUCCH, and a physical random access channel PRACH.

In some embodiments, the EPRE information includes at least one of the following: a fixed value of EPRE and a variation range of EPRE.

In some embodiments, considering that the EPRE of the MT is at the same level as that of the DU, the EPRE information is replaced by at least one of the following:
  EPRE for SSB transmission of a DU of the IAB node;
  EPRE for PSS transmission of the DU of the IAB node;
  EPRE for SSS transmission of the DU of the IAB node;
  EPRE for PBCH transmission of the DU of the IAB node;
  EPRE for CSI-RS transmission of the DU of the IAB node, where the CSI-RS may represent only a periodic CSI-RS;

EPRE for PDCCH transmission of the DU of the IAB node; and

EPRE for PDSCH transmission of the DU of the IAB node.

In some embodiments, the EPRE information is EPRE for uplink transmission corresponding to a specific occasion.

In some embodiments, the processor 510 is specifically configured to perform any one of the following:

obtaining assistance information that is related to the transmission parameter of the second IAB node and predefined by a protocol, which, for example, is notified to the DU by using F1-C signaling, or is notified to the MT by using radio resource control (RRC) signaling.

obtaining assistance information that is related to the transmission parameter of the second IAB node and notified by a centralized unit; and receiving the assistance information sent by the second IAB node, where transmission of the assistance information may alternatively be triggered by the first IAB node, for example, the first IAB node sends a request, and the second IAB node sends the assistance information to the first IAB node or the CU after receiving the request.

In some embodiment, the first IAB node is an IAB node and the second IAB node is a parent IAB node, and the assistance information includes a transmission bandwidth of a mobile termination MT of the IAB node, where the processor 510 is specifically configured to: determine a transmit power of the MT based on transmit power information of the IAB node and the transmission bandwidth of the MT.

In some embodiments, the processor 510 is specifically configured to perform at least one of the following:

determining that the transmit power of the MT is EPRE1*scheduled BW, where EPRE1 is a value of EPRE for MT transmit, and scheduled BW is the transmission bandwidth of the MT;

determining that the transmit power of the MT is not less than EPREmin*scheduled BW, where EPREmin is a minimum value of EPRE for MT transmit; and determining that the transmit power of the MT is not greater than EPREmax*scheduled BW, where EPREmax is a maximum value of EPRE for MT transmit.

In some embodiments, the processor 510 is specifically configured to obtain transmit power information of the first IAB node itself, where the transmit power information of the first IAB node includes:

transmit power information of a downlink physical signal and/or channel of a DU of the first IAB node.

In some embodiments, the processor 510 is specifically configured to perform at least one of the following:

obtaining transmit power information of a moment of simultaneous DU transmit and MT transmit for a same type of downlink physical channel;

obtaining transmit power information of a moment of simultaneous DU transmit and MT transmit for a same type of downlink physical signal;

obtaining transmit power information of a moment of non-simultaneous DU transmit and MT transmit for a same type of downlink physical channel; and obtaining transmit power information of a moment of non-simultaneous DU transmit and MT transmit for a same type of downlink physical signal.

In some embodiments, the processor 510 is further configured to: during signal measurement on the downlink physical signal, perform an align operation on a quality measurement value measured at a moment of simultaneous DU transmit and MT transmit for the first IAB node and a quality measurement value measured at a moment of non-simultaneous DU transmit and MT transmit.

In some embodiments, the downlink physical signal or channel includes at least one of the following:

SSB, PSS, SSS, PBCH, and CSI-RS, where the CSI-RS may represent only a periodic CSI-RS.

In some embodiments, the first IAB node is a parent IAB node and the second IAB node is an IAB node, and the assistance information includes information about a transmit beam of the parent IAB node measured by the IAB node, where the processor 510 is further configured to perform beam selection based on the assistance information.

In some embodiments, the plurality of beams include at least one of the following:

at least part of beams whose quality measurement value is greater than or equal to a preset threshold; and at least part of beams whose quality measurement value is less than or equal to a preset threshold.

In some embodiments, the first IAB node is a parent IAB node and the second IAB node is an IAB node, and the assistance information further includes a beam used for transmission by a DU of the IAB node at a preset moment, where the processor 510 is further configured to perform beam selection based on the assistance information:

determining, based on the assistance information, a transmission parameter used for transmission to an MT of the IAB node, where the transmission parameter includes at least one of a beam parameter, a power parameter, and a coding and modulation scheme parameter; and determining, based on the assistance information, whether to transmit data to the MT of the IAB node at the preset moment.

In order to assist the parent node in determining, the IAB node may also report an interference status of a DU-MT beam pair. In some embodiments, the assistance information further includes the interference status of the DU-MT beam pair. The interference status of the DU-MT beam pair may include: interference of DU to MT or interference of MT to DU during transmission using a DU-MT beam pair. The interference status can also directly reflect whether the IAB node can use the DU-MT beam pair for simultaneous transmission. For example, the interference status is represented in binary, '0' means the DU-MT beam pair being allowed for simultaneous transmission, and '1' means the DU-MT beam pair not being allowed for simultaneous transmission; or vice versa.

An embodiment of this application further provides a readable storage medium, where a program or instructions are stored in the readable storage medium. When the program or the instructions are executed by a processor, the processes of the foregoing embodiment of the transmission parameter management method can be implemented, with the same technical effects achieved. To avoid repetition, details are not described herein again.

The processor is a processor in the electronic device described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions to implement the processes of the foregoing embodiments of the transmission parameter management method, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that in this specification, the term "include", "comprise", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, a network device, or the like) to perform the methods described in the embodiments of this disclosure.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A transmission parameter management method, executed by a first integrated access backhaul IAB node and comprising:
   obtaining assistance information related to a transmission parameter of a second IAB node and/or assistance information related to a measurement parameter; and
   determining a transmission parameter based on the assistance information;
   wherein the first IAB node is an IAB node and the second IAB node is a parent IAB node, and the assistance information comprises transmit power information of a distributed unit DU of the parent IAB node, wherein the transmit power information of the DU of the parent IAB node comprises:
   transmit power information of a physical downlink channel, wherein the physical downlink channel comprises a physical downlink shared channel PDSCH and/or a physical downlink control channel PDCCH.

2. The transmission parameter management method according to claim 1, wherein the determining a transmission parameter based on the assistance information comprises:
   determining an uplink power control parameter of a DU of the IAB node based on the assistance information, wherein independent power control parameters and/or independent power control processes are used for an occasion of simultaneous DU receive and MT receive of the parent IAB node.

3. The transmission parameter management method according to claim 1, wherein the transmit power information of the physical downlink channel of the DU of the parent IAB node comprises:
   energy per resource element EPRE information of the physical downlink channel.

4. The transmission parameter management method according to claim 3, wherein the EPRE information comprises at least one of the following: a fixed value of EPRE and a variation range of EPRE.

5. The transmission parameter management method according to claim 4, wherein the variation range of EPRE comprises at least one of the following:
   a maximum and/or minimum value of the EPRE of the physical downlink channel;
   a difference between the maximum and minimum values of the EPRE of the physical downlink channel;
   an offset range of the EPRE of the physical downlink channel relative to EPRE for synchronization signal block SSB transmission of the parent IAB node;
   an offset range of the EPRE of the physical downlink channel relative to EPRE for primary synchronization signal PSS transmission of the parent IAB node;
   an offset range of the EPRE of the physical downlink channel relative to EPRE for secondary synchronization signal SSS transmission of the parent IAB node;
   an offset range of the EPRE of the physical downlink channel relative to EPRE for physical broadcast channel PBCH transmission of the parent IAB node; and
   an offset range of the EPRE of the physical downlink channel relative to EPRE for channel state information reference signal CSI-RS transmission of the parent IAB node.

6. The transmission parameter management method according to claim 4, wherein the fixed value of EPRE comprises at least one of the following:
   an offset value of the EPRE of the physical downlink channel relative to EPRE for SSB transmission of the parent IAB node;
   an offset value of the EPRE of the physical downlink channel relative to EPRE for PSS transmission of the parent IAB node;
   an offset value of the EPRE of the physical downlink channel relative to EPRE for SSS transmission of the parent IAB node;
   an offset value of the EPRE of the physical downlink channel relative to EPRE for PBCH transmission of the parent IAB node; and an offset value of the EPRE of the physical downlink channel relative to EPRE for CSI-RS transmission of the parent IAB node.

7. The transmission parameter management method according to claim 1, wherein the transmit power information of the physical downlink channel is determined based on at least one of the following characteristics of the physical downlink channel:
- a beam direction for transmission of the physical downlink channel;
- a type of information carried by the physical downlink channel;
- a scheduling mode for transmission of the physical downlink channel; and
- a time-frequency resource for transmission of the physical downlink channel.

8. The transmission parameter management method according to claim 1, wherein the obtaining assistance information related to a transmission parameter of a second IAB node comprises any one of the following:
- obtaining assistance information that is related to the transmission parameter of the second IAB node and predefined by a protocol;
- obtaining assistance information that is related to the transmission parameter of the second IAB node and notified by a centralized unit; and
- receiving the assistance information sent by the second IAB node.

9. The transmission parameter management method according to claim 1, further comprising: obtaining transmit power information of the first IAB node itself, wherein the transmit power information of the first IAB node comprises:
- transmit power information of a downlink physical signal and/or channel of a DU of the first IAB node.

10. The transmission parameter management method according to claim 1, wherein the assistance information further comprises an interference status of a DU-MT beam pair.

11. A transmission parameter management method, executed by a first integrated access backhaul IAB node and comprising:
- obtaining assistance information related to a transmission parameter of a second IAB node and/or assistance information related to a measurement parameter; and
- determining a transmission parameter based on the assistance information;
- wherein the first IAB node is a parent IAB node and the second IAB node is an IAB node, and the assistance information comprises transmit power information of the IAB node, wherein the transmit power information of the IAB node comprises at least one of the following:
- energy per resource element EPRE information of a sounding reference signal SRS; and
- EPRE information of a physical channel, wherein the physical channel comprises at least one of a physical uplink shared channel PUSCH, a physical uplink control channel PUCCH, and a physical random access channel PRACH.

12. The transmission parameter management method according to claim 11, wherein the assistance information comprises a transmission bandwidth of a mobile termination MT of the IAB node, wherein the determining a transmission parameter based on the assistance information comprises:
- determining a transmit power of the MT based on transmit power information of the IAB node and the transmission bandwidth of the MT.

13. The transmission parameter management method according to claim 11, wherein the EPRE information comprises at least one of the following: a fixed value of EPRE and a variation range of EPRE.

14. The transmission parameter management method according to claim 11, wherein the EPRE information is replaced by at least one of the following:
- EPRE for SSB transmission of a DU of the IAB node;
- EPRE for PSS transmission of the DU of the IAB node;
- EPRE for SSS transmission of the DU of the IAB node;
- EPRE for PBCH transmission of the DU of the IAB node;
- EPRE for CSI-RS transmission of the DU of the IAB node;
- EPRE for PDCCH transmission of the DU of the IAB node; and
- EPRE for PDSCH transmission of the DU of the IAB node.

15. The transmission parameter management method according to claim 11, wherein the EPRE information is EPRE for uplink transmission corresponding to a specific occasion.

16. An electronic device, comprising a processor, a memory, and a program or instructions stored in the memory and capable of running on the processor, wherein when the program or the instructions are executed by the processor, the following steps are implemented:
- obtaining assistance information related to a transmission parameter of a second IAB node and/or assistance information related to a measurement parameter; and
- determining a transmission parameter based on the assistance information;
- wherein the first IAB node is an IAB node and the second IAB node is a parent IAB node, and the assistance information comprises transmit power information of a distributed unit DU of the parent IAB node, wherein the transmit power information of the DU of the parent IAB node comprises:
- transmit power information of a physical downlink channel, wherein the physical downlink channel comprises a physical downlink shared channel PDSCH and/or a physical downlink control channel PDCCH.

17. The electronic device according to claim 16, wherein the transmit power information of the physical downlink channel of the DU of the parent IAB node comprises:
- energy per resource element EPRE information of the physical downlink channel.

18. The electronic device according to claim 17, wherein the EPRE information comprises at least one of the following: a fixed value of EPRE and a variation range of EPRE.

19. The electronic device according to claim 18, wherein the fixed value of EPRE comprises at least one of the following:
- an offset value of the EPRE of the physical downlink channel relative to EPRE for SSB transmission of the parent IAB node;
- an offset value of the EPRE of the physical downlink channel relative to EPRE for PSS transmission of the parent IAB node;
- an offset value of the EPRE of the physical downlink channel relative to EPRE for SSS transmission of the parent IAB node;
- an offset value of the EPRE of the physical downlink channel relative to EPRE for PBCH transmission of the parent IAB node; and
- an offset value of the EPRE of the physical downlink channel relative to EPRE for CSI-RS transmission of the parent IAB node.

20. The electronic device according to claim 16, wherein the transmit power information of the physical downlink channel is determined based on at least one of the following characteristics of the physical downlink channel:
- a beam direction for transmission of the physical downlink channel;
- a type of information carried by the physical downlink channel;
- a scheduling mode for transmission of the physical downlink channel; and
- a time-frequency resource for transmission of the physical downlink channel.

\* \* \* \* \*